United States Patent [19]

Coulson

[11] 3,876,387

[45] Apr. 8, 1975

[54] METHOD OF PRODUCING BURKEITE
[75] Inventor: Norman William Coulson, Oklahoma City, Okla.
[73] Assignee: Kerr-McGee Chemical Co., Oklahoma City, Okla.
[22] Filed: Mar. 13, 1972
[21] Appl. No.: 233,943

[52] U.S. Cl. .................. 23/302; 159/20; 423/203; 423/551
[51] Int. Cl. ............................................. C01d 1/30
[58] Field of Search ...... 23/296, 298, 302; 159/165, 159/20; 423/179, 184, 195, 203, 551

[56] References Cited
UNITED STATES PATENTS

| 1,810,181 | 6/1931 | MacDonald | 23/298 |
| 1,873,251 | 8/1932 | Allen | 23/298 |
| 2,392,888 | 1/1946 | Suhr | 23/296 |
| 2,448,191 | 8/1948 | Pike | 23/296 |
| 3,515,521 | 6/1970 | Cap | 23/296 |

Primary Examiner—Norman Yudkoff
Assistant Examiner—Hiram H. Bernstein
Attorney, Agent, or Firm—William G. Addison

[57] ABSTRACT

The present invention relates to a method of producing burkeite crystals from a brine. More particularly, it relates to a method wherein the brine is heated in several stages. In the last stage, heating is accomplished by the direct introduction of steam into the brine.

4 Claims, 6 Drawing Figures

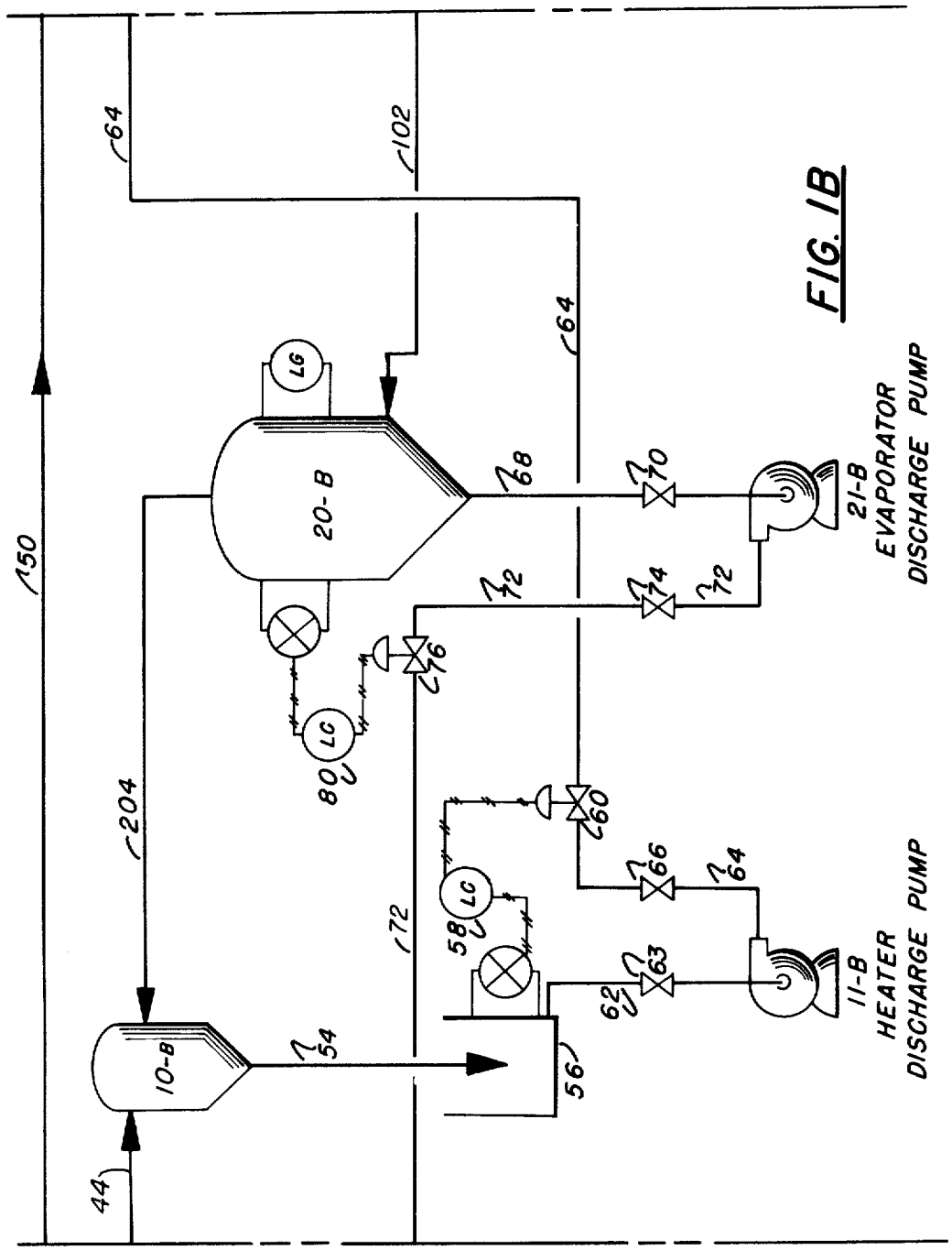
FIG. IB

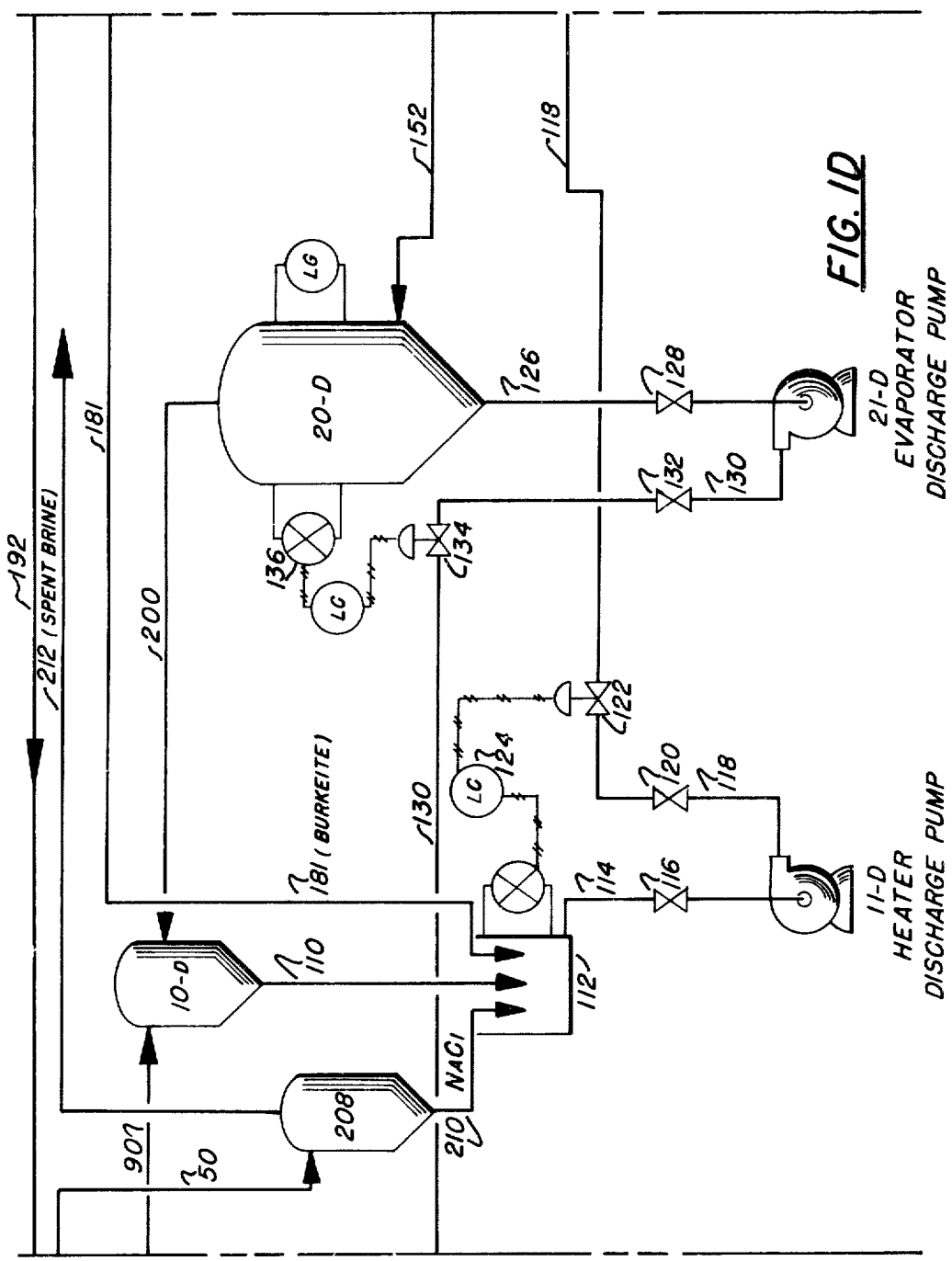
FIG. ID

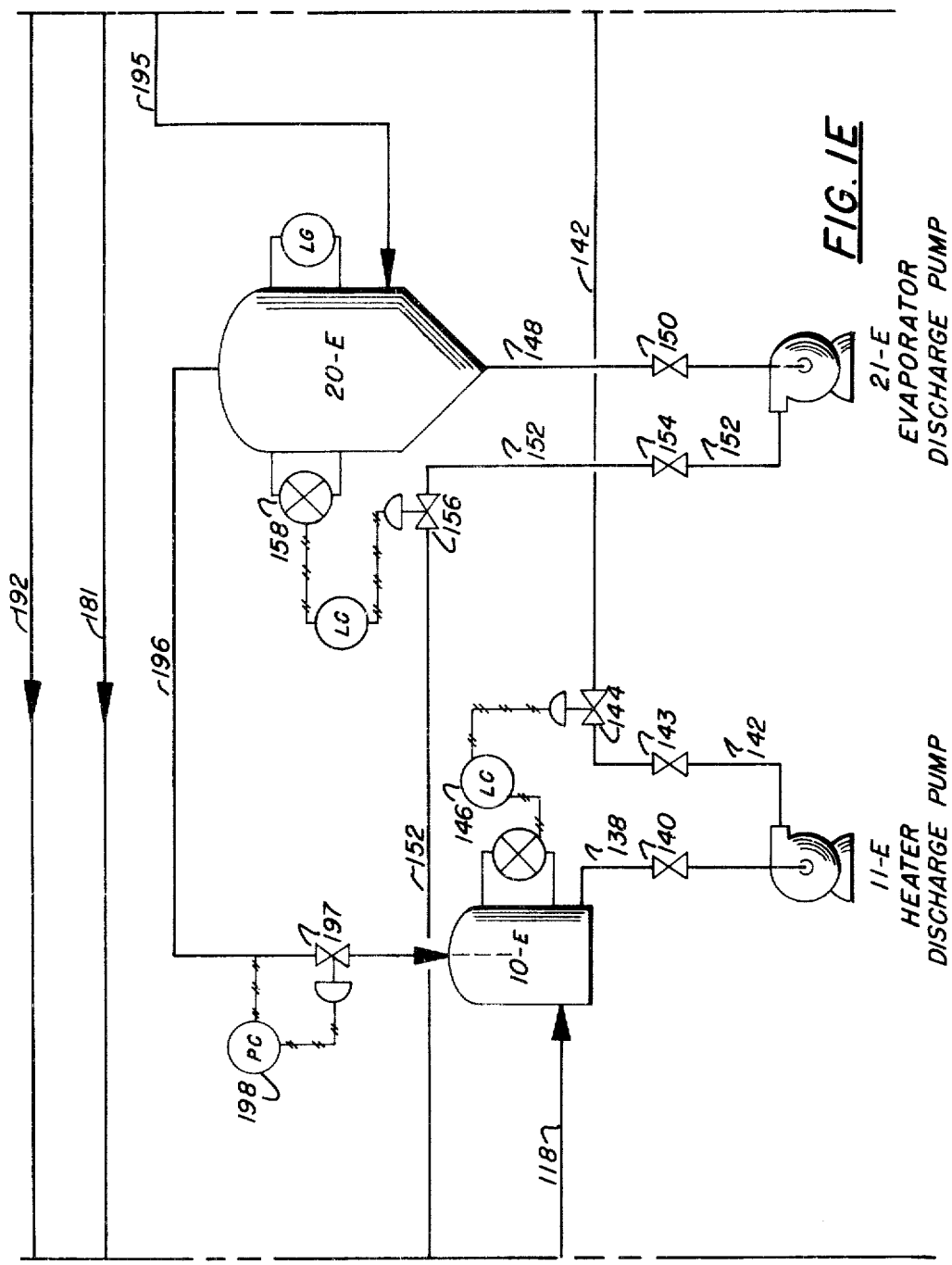

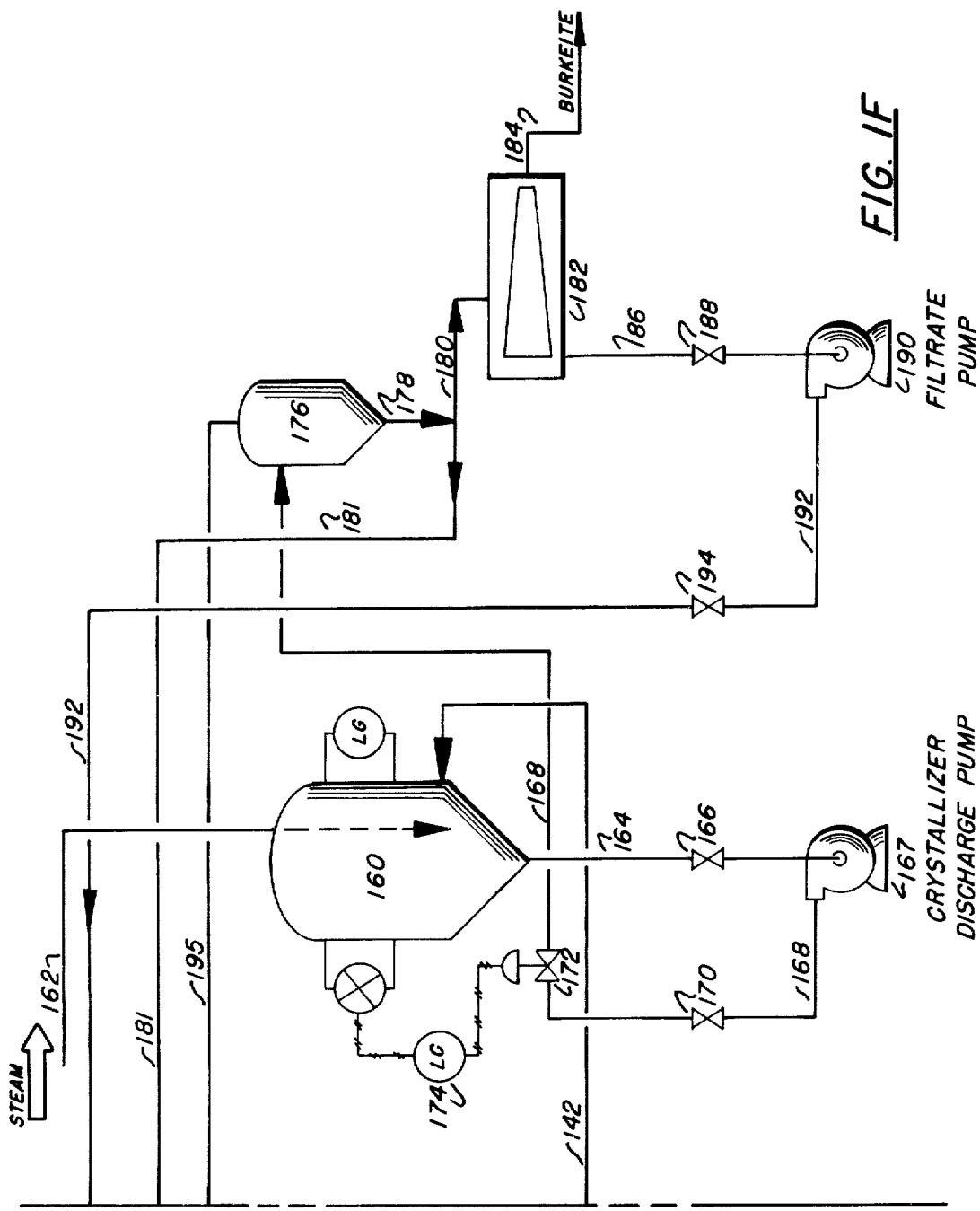
FIG. IF

METHOD OF PRODUCING BURKEITE

BACKGROUND OF THE INVENTION

Burkeite is a double salt of sodium sulfate and sodium carbonate, the more common form being represented by the formula $Na_2CO_3 \cdot 2Na_2SO_4$. Burkeite was discovered in about 1919 and is found in naturally occuring brines such as those at Searles Lake. Burkeite crystals are obtained by heating such a brine since burkeite has an invert solubility. That is to say, with an increase in temperature the solubility of burkeite in the brine decreases. The yield of burkeite crystals is, of course, a function of temperature, with a higher temperature producing a greater yield.

One method of heating the brine is by submerged combustion, that is to say, by the introduction of gaseous products of combustion into the brine. The maximum temperature to which the brine can be heated by such a method is a function of the partial pressure of the water vapor in the gaseous products of combustion and is normally about 150°F. At such temperatures relatively little of the burkeite is crystallized. Further, such a process is wasteful of heat in that no heat recovery is possible.

When a brine is heated by introducing steam directly into the brine it is possible to heat it to any desired temperature depending upon the temperature of the steam utilized. However, this process also is wasteful of heat.

Another heating method utilizes a conventional heat exchanger. The brine is passed through tubes in the heat exchanger and heated by condensation of steam on the heat exchanger tubes. Such a heating method overcomes the loss of heat involved in the prior processes in that heat can be transferred from the hot, spent brine. However, since burkeite has an inverse solubility, as heat is added the temperature of the brine increases, and crystallization of burkeite occurs on the heat transfer surfaces reducing the heat transfer rate. While the process is efficient the size of the equipment must be larger to accommodate the crystal build up on the heat transfer surfaces. Further, means must be provided to remove the heat transfer surfaces from operation for removal of the crystallized burkeite from those surfaces.

SUMMARY OF THE INVENTION

The present invention provides a method of producing burkeite crystals from a brine containing the burkeite and sodium chloride. The method utilizes at least a first and last heating zone, at least a first and last evaporator zone and a crystallizing zone. A body of brine and warm vapors are maintained in each of the evaporator zones. The brine is passed sequentially through said first and last heating zones and introduced into the crystallizing zone. Steam is introduced into the brine in the crystallizing zone whereby the brine is heated and a substantial portion of the burkeite contained therein is crystallized. The warm vapors in the first and last evaporator zones are withdrawn and introduced into the first and last heating zones, respectively. The heated crystal-containing brine is withdrawn from the crystallizing zone and the burkeite crystals recovered from the brine. The heated brine then is passed sequentially through the last and first evaporator zones.

In a preferred embodiment, the brine from the first evaporator zone is withdrawn and passed to a separation zone to recover the sodium chloride. The sodium chloride thus recovered may be added to the brine intermediate the first and last heating zones to increase the yield of burkeite crystals.

BRIEF DESCRIPTION OF THE DRAWINGS

The drawings illustrates one presently preferred arrangement of apparatus for use in practicing the method of the instant invention.

DESCRIPTION OF A PREFERRED EMBODIMENT

The instant invention provides a method for producing burkeite crystals from a feed brine containing the same and sodium chloride. The method utilizes at least two preheating effects and a crystallizing zone. Each of the preheating effects comprises a heating zone and an evaporator zone. A body of brine and warm vapors are maintained in each of the evaporator zones. A feed brine is introduced into the first effect heater and contacted with the warm vapors withdrawn from the frist effect evaporator zone whereby the brine is heated. That brine then is withdrawn from the first effect heating zone and passed into the second effect heating zone where it is contacted with the warm vapors withdrawn from the second effect evaporator zone whereby the temperature of the brine is further increased. The brine then is withdrawn from the second effect heater and passed to a crystallizing zone and steam is introduced into the brine in the crystallizing zone whereby the brine is further heated and a substantial portion of the burkeite therein is crystallized. The hot, crystal-containing brine is withdrawn from the crystallizing zone, the crystals separated and recovered from the brine and the substantially crystal-free hot brine then is passed sequentially through the second effect evaporator and into the first effect evaporator zone.

In a preferred embodiment of the instant invention, the brine from the first effect evaporator is passed to a separation zone wherein the sodium chloride is recovered. The separation zone may be a settling tank, centrifuge, cyclone separator or the like. Preferably at least a portion of the recovered sodium chloride is added to the feed brine intermediate the first and last heating zones in an amount sufficient to saturate the brine with respect to the sodium chloride.

It will be obvious, of course, to those skilled in the art that the number of preheating effects may be varied greatly. With a greater number of preheating effects, the amount of steam required is reduced. However, it has been found that the cost of installing more than seven preheating effects is not justified by the small additional savings in steam thus obtained. A preferred number of preheating effects is from 3 to 5.

The heaters utilized are of a type generally known as barometric condensers. A brine and warm vapors from an evaporator are contacted in the condenser. The condenser is designed, by known methods, to increase the temperature of the brine to within about 5°F of the temperature of the warm vapors. The warm vapors are condensed by the cooler brine thus creating a pressure differential between the condenser and evaporator. The flow of warm vapors is maintained by that pressure differential.

Figure 1A:
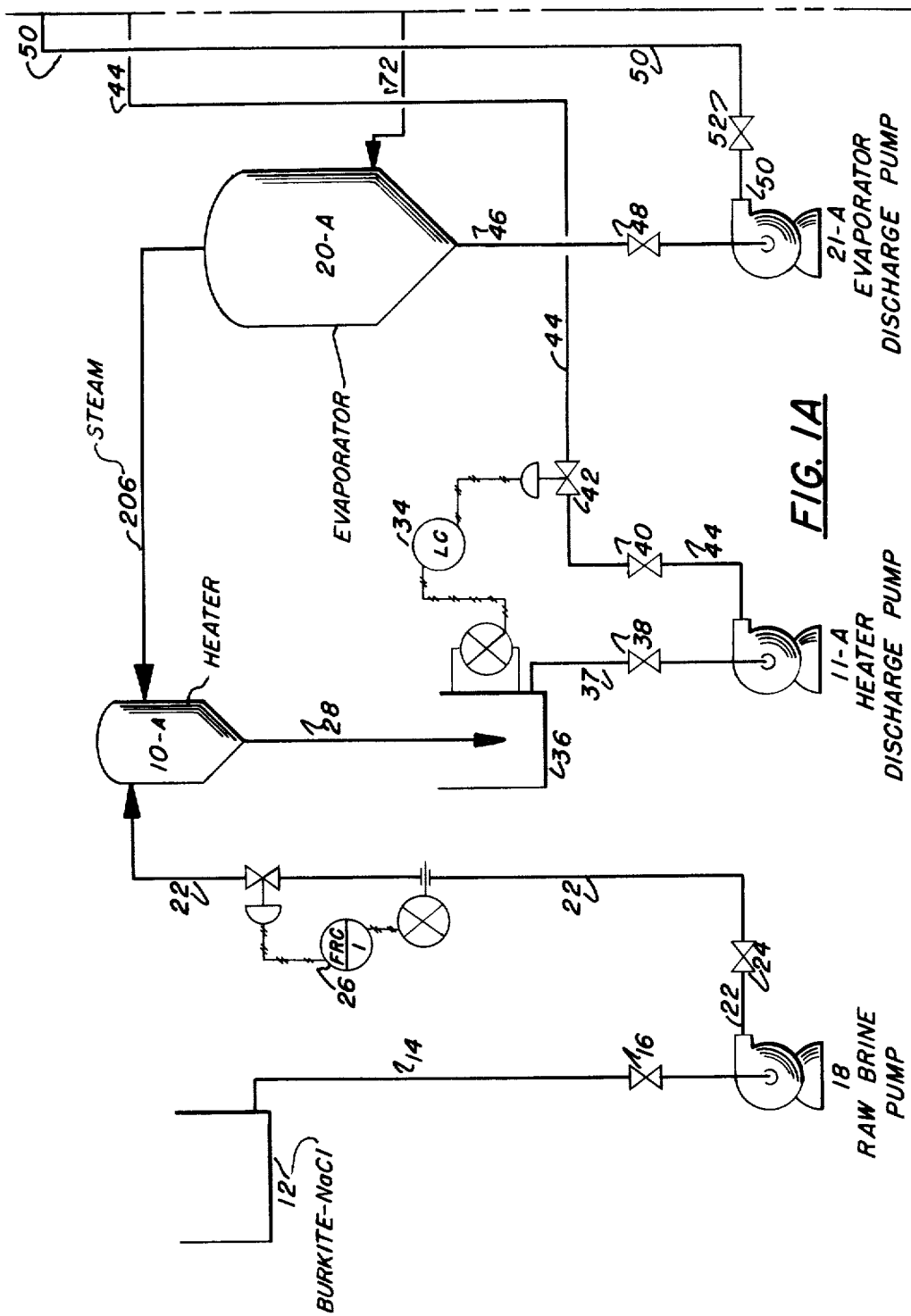

Referring now to the drawings (FIG. 1A to 1F), therein is depicted a preferred variation of the instant invention utilizing 5 preheating effects. A feed brine containing burkeite and sodium chloride is transferred from holding tank 12 by pump 18 via conduit 14, 22 and valves 16 and 24. The rate of flow of the feed brine into heater 10-A is regulated by a flow rate controller, designated generally by reference numeral 26. The warm vapors are withdrawn from evaporator 20-A and enter heater 10-A via conduit 206. There they are condensed by and increase the temperature of the feed brine. The brine is passed from heater 10-A to hot well 36 through conduit 28. From hot well 36 the brine is transferred to heater 10-B (FIG. 1B) by heater discharge pump 11-A via conduit 37, valve 38, and conduit 44, valve 40 and flow control valve 42. Level control 34 maintains a predetermined level of brine in hot well 36 by controlling flow control valve 42. The warm vapors from evaporator 20-B (FIG. 1B) enter heater 10-B via conduit 204. The warm vapors are condensed by and further heat the brine. The brine is transferred to hot well 56 via conduit 54. Heater discharge pump 11-B transfers the brine from hot well 56 to heater 10-C (FIG. 1C), via conduit 62, valve 63, conduit 64, valve 66 and flow control valve 60. Flow control valve 60 is regulated by level control 58 to maintain a predetermined level of brine in hot well 56. Warm vapors enter heater 10-C from evaporator 20-C (FIG. 1C) via conduit 202. The warm vapors are condensed by and still further heat the brine. The brine leaves heater 10-C via conduit 82 to enter hot well 84. The brine is transferred from hot well 84 by heater discharge pump 11-C to heater 10-D (FIG. 1D) via conduit 86, valve 88, conduit 90, valve 92 and flow control valve 94. Flow control valve 94 is regulated by level control 96 to maintain a predetermined level of brine in hot well 84. Warm vapors are withdrawn from evaporator 20-D (FIG. 1D) via conduit 200 and enter heater 10-D where they are condensed by and still further heat the brine. The brine is passed from heater 10-D via conduit 110 to hot well 112. The brine is transferred from hot well 112 to heater 10-E (FIG. 1E) by heater discharge pump 11-D via conduit 114, valve 116, conduit 118, valve 120 and flow control valve 122. Flow control valve 122 is regulated by level controller 124 to maintain a predetermined level of brine in hot well 112. The warm vapors from evaporator 20-E (FIG. 1E) are passed to heater 10-E via conduit 196 and flow control valve 197. Flow control valve 197 is regulated by pressure controller 198. The brine is transferred from heater 10-E to crystallizer vessel 160 (FIG. 1F) by heater discharge pump 11-E via conduit 138, valve 140, conduit 142, valve 143 and flow control valve 144. Flow control valve 144 is regulated by level control 146 to maintain a predetermined level of brine in heater 10-E. Steam (source not shown) is added to crystallizing vessel 160 via conduit 162 and introduced directly into the body of brine therein. Sufficient steam is added to raise the temperature of the brine to at least 175°F, whereby a portion of the burkeite is crystallized. It is preferred that sufficient steam be added to raise the temperature of the brine to about 285°F. The hot crystal-containing brine is withdrawn from crystallizing vessel 160 via conduit 164 and valve 166, and transferred by crystallizer discharge pump 167 via conduit 168, valve 170 and flow control valve 172 to cyclone separator 176. The hot, substantially crystal-free brine from separator 176 is passed to evaporator 20-E (FIG. 1E) via conduit 195.

The brine in evaporator 20-E is transferred to evaporator 20-D (FIG. 1D) by evaporator discharge pump 21-E via conduit 148, valve 150, conduit 152, valve 154, and flow control valve 156. Flow control valve 156 is controlled by level controller 158 to maintain a desired level of brine in evaporator 20-E. The brine in evaporator 20-D is transferred to evaporator 20-C (FIG. 1C) by evaporator discharge pump 21-D via conduit 126, valve 128, conduit 130, valve 132 and flow control valve 134. Flow control valve 134 is regulated by level controller 136 to maintain a desired level of brine in evaporator 20-D. The brine in evaporator 20-C (FIG. 1C) is transferred to evaporator 20-B by evaporator discharger pump 21-C via conduit 98, valve 100, conduit 102, valve 104 and flow control valve 106. The flow control valve 106 is regulated by level controller 108 to maintain a predetermined level of brine in evaporator 20-C. The brine in evaporator 20-B is transferred to evaporator 20-A (FIG. 1A) by pump 21-B via conduit 68, valve 70, conduit 72, valve 74, and flow control valve 76. Flow control valve 76 is regulated by level control 80 to maintain the desired level of brine in evaporator 20-B.

In a preferred embodiment of the instant invention the brine in evaporator 20-A (FIG. 1A) is transferred by evaporator discharge pump 21-A to sodium chloride separator 208 (FIG. 1D) via conduit 46, valve 48, conduit 50 and valve 52. The sodium chloride is recovered from separator 208 and added to the brine in hot well 112 via conduit 210. It is advantageous to add sufficient sodium chloride to the brine such that it will be saturated, with respect to the sodium chloride, when the brine is heated to the burkeite cyrstallization temperature of about 285°F. The brine, substantially free of sodium chloride crystals, may then be disposed of as waste via line 212.

Figure 1C:
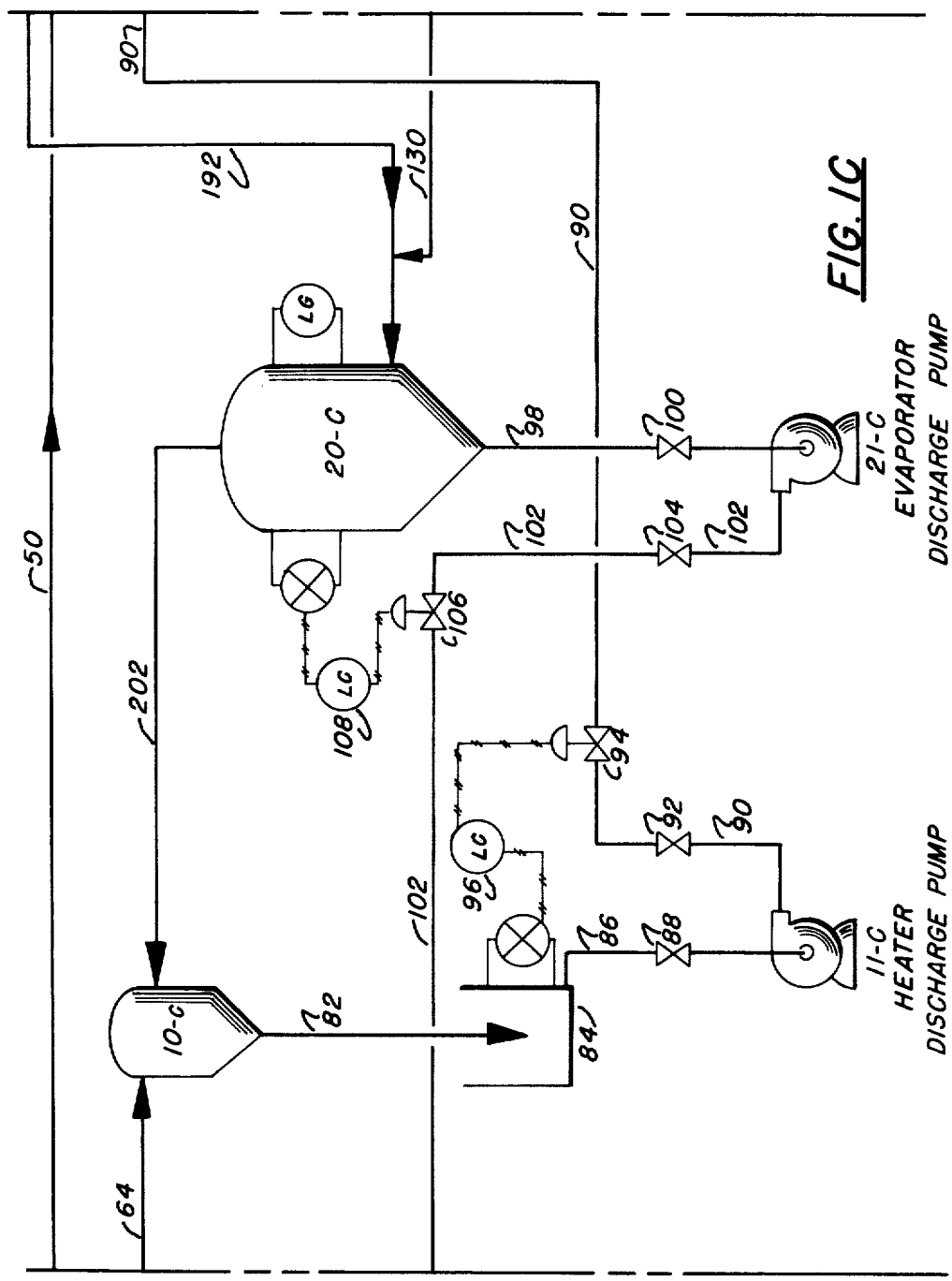

Returning now to cyclone separator 176 (FIG. 1F), the burkeite crystals are withdrawn via conduit 178 and may be passed via conduit 180 to centrifuge 182 for further separation of the crystals from the brine. In centrifuge 182 substantially all the remaining brine is separated from the burkeite crystals and may be transferred by filtrate pump 190 from centrifuge 182 to one of the preceeding evaporators. It is preferred that that brine be introduced in the evaporator having a body of brine maintained therein at or slightly below the temperature of the brine leaving the centrifuge. When utilizing a five effect preheating system as shown in the drawings, it has been found advantageous to pump the brine from centrifuge 182 via conduit 186, valve 188, conduit 192, and valve 194 to evaporator 20-C (FIG. 1C). When it is desired to obtain larger crystals of burkeite, a portion of the brine withdrawn from cyclone separator 176 (FIG. 1F) may be recycled via conduit 178 and conduit 181 to hot well 112 (FIG. 1D).

The burkeite crystals which are withdrawn from centrifuge 182 (FIG. 1F) via conduit 184 are recovered for drying and subsequent processing.

EXAMPLE

This example illustrates the method of the instant invention employing the apparatus depicted in the drawings and described hereinbefore.

A feed brine is prepared having the following composition:

| COMPONENT | PERCENT BY WEIGHT |
| --- | --- |
| $Na_2SO_4$ | 7.02 |
| $Na_2CO_3$ | 4.43 |

-Continued

| COMPONENT | PERCENT BY WEIGHT |
|---|---|
| NaCl | 15.78 |
| KCl | 3.75 |
| $Na_2B_4O_7$ | 1.50 |
| Misc. Other Salts | 1.00 |
| $H_2O$ | 66.52 |

The brine is introduced into heater 10–A at a rate of 6240 gpm and a temperature of 80°F. The temperature of the brine is increased to 113°F, 146°F, 179°F, 212°F, and 245°F in heaters 10–A, 10–B, 10–C, 10–D and 10–E, respectively by recycling warm vapors from the evaporators 20–A, 20–B, 20–C, 20–D and 20–E as described hereinbefore. The brine from heater 10–E is passed to the crystallizer where it is contacted with steam. The steam, at a pressure of 35 psi and at a temperature of 285°F, in introduced into the crystallizer at a rate of 1.8 lbs. per minute whereby the temperature of the brine in the crystallizer is raised to 285°F. The hot burkeite crystal-containing brine is withdrawn from the crystallizer and the burkeite crystals recovered therefrom as described hereinbefore. A yield of 6.78 lbs. of burkeite per 100 lbs. brine is obtained. A body of brine and warm vapors are maintained in evaporators 20–A, 20–B, 20–C, 20–D and 20–E at temperatures of 118°F, 151°F, 184°F, 217°F and 250°F respectively.

To obtain a similar yield utilizing only a single preheating effect it is necessary to provide a steam flow rate of about 10.7 lbs. per minute as opposed to the 1.8 lbs. per minute utilized in accordance with the method of the instant invention.

The foregoing description and example is for the purpose of illustration and is not to be considered as limiting the scope of the invention, reference being had to the appended claims for this purpose.

What is claimed is:

1. A method of producing burkeite crystals from a feed brine containing burkeite and sodium chloride comprising:
   a. providing at least a first and last heating zone;
   b. providing at least a first and last evaporator zone;
   c. providing a crystallizing zone;
   d. maintaining a body of brine and warm vapors in each of said evaporator zones;
   e. passing the feed brine sequentially through said first and last heater zones;
   f. withdrawing a stream of warm vapors from said first evaporator zone and introducing it into said first heating zone, withdrawing a stream of warm vapors from said last evaporator zone and introducing it into said least heating zone;
   g. introducing the feed brine from said last heating zone into a crystallizing zone;
   h. introducing steam into the brine in said crystallizing zone whereby the brine is heated to a temperature of at least 175° F. and a substantial portion of the burkeite contained therein is crystallized;
   i. withdrawing the burkeite crystal-containing brine from said crystallizing zone, separating and recovering the burkeite crystals from the brine and;
   j. passing the substantially burkeite crystalfree brine through said last evaporator zone into said first evaporator zone.

2. The method of claim 1 wherein said substantially burkeite crystal-free brine from said first evaporator zone is passed to a separation zone and recovering a portion of the sodium chloride from said brine.

3. The method of claim 1 wherein there is provided a first through fifth heating zones and a first through fifth evaporator zones and a stream of warm vapors is withdrawn from each evaporator zone and introduced into the corresponding heating zone, the brine is passed sequentially through the first through fifth heating zones into the crystallizing zone and the substantially burkeite crystal-free brine is passed sequentially and countercurrently through the fifth through first evaporator zones.

4. The method of claim 1 wherein additional sodium chloride is added to said feed brine, intermediate said first and last heating zones, in an amount sufficient to maintain said brine substantially saturated with respect to said sodium chloride.

* * * * *